Oct. 16, 1956

O. K. KELLEY 2,766,641

DUAL RANGE PLURAL TURBINE-GEAR DRIVE

Filed Nov. 8, 1950

Inventor
Oliver K. Kelley
By Willis, Helmig & Baillio
Attorneys

United States Patent Office 2,766,641
Patented Oct. 16, 1956

2,766,641

DUAL RANGE PLURAL TURBINE-GEAR DRIVE

Oliver K. Kelley, Birmingham, Mich., assignor to General Motors Corporation, Detroit, Mich., a corporation of Delaware Application November 8, 1950, Serial No. 194,626

33 Claims. (Cl. 74—677)

This invention relates to torque transmitting structures and more particularly to torque converters particularly adapted for use in automotive vehicles.

Torque converters, as commonly employed in present day practice, employ a single output turbine member directly connected to the converter output shaft, such construction being relatively inefficient due to internal slip in the converter, particularly at low vehicle speeds. Such conventional constructions commonly impart excess heat to the working fluid of the converter due to excess internal slip and friction loss in the transfer of energy to the output turbine, resulting in low fuel economy, slow vehicle acceleration, and making necessary the provision of expensive cooling means for preventing over-heating of the working fluid. Attempts have been made to provide dual-range converters by using manual or automatic control means for directing the fluid through various paths in the converter to vary the effectiveness of the converter, but such arrangements have proven to be relatively expensive to manufacture and maintain and have not proven to be entirely satisfactory.

By this invention there is provided a torque transmitting structure incorporating an automatic shift feature whereby shift from a "low" range to a "high" range, as determined by the torque and by the velocity of the circulating working fluid, is accomplished without any external controls whatever.

An object of this invention is to provide a plural range torque transmitting structure in which shift from a relatively "low" range to a relatively "high" range occurs automatically and without the use of external controls.

Another object of this invention is to provide a plural range torque transmitting structure having a plurality of turbine members for transferring torque to a power output shaft, in which the torque is transferred by said turbine members consecutively and automatically, and without any lapse of torque transfer.

A further object of this invention is to provide a torque transfer mechanism for transferring torque to an output shaft, incorporating plural turbine members in which one of the turbine members is operatively connected to the output shaft without gear reduction and another of the turbine members is connected to the output shaft by means of a gear train.

These and other objects and advantages of this invention will be apparent from the following specification and claims taken in conjunction with the accompanying drawing, in which:

Figures 1, 2:
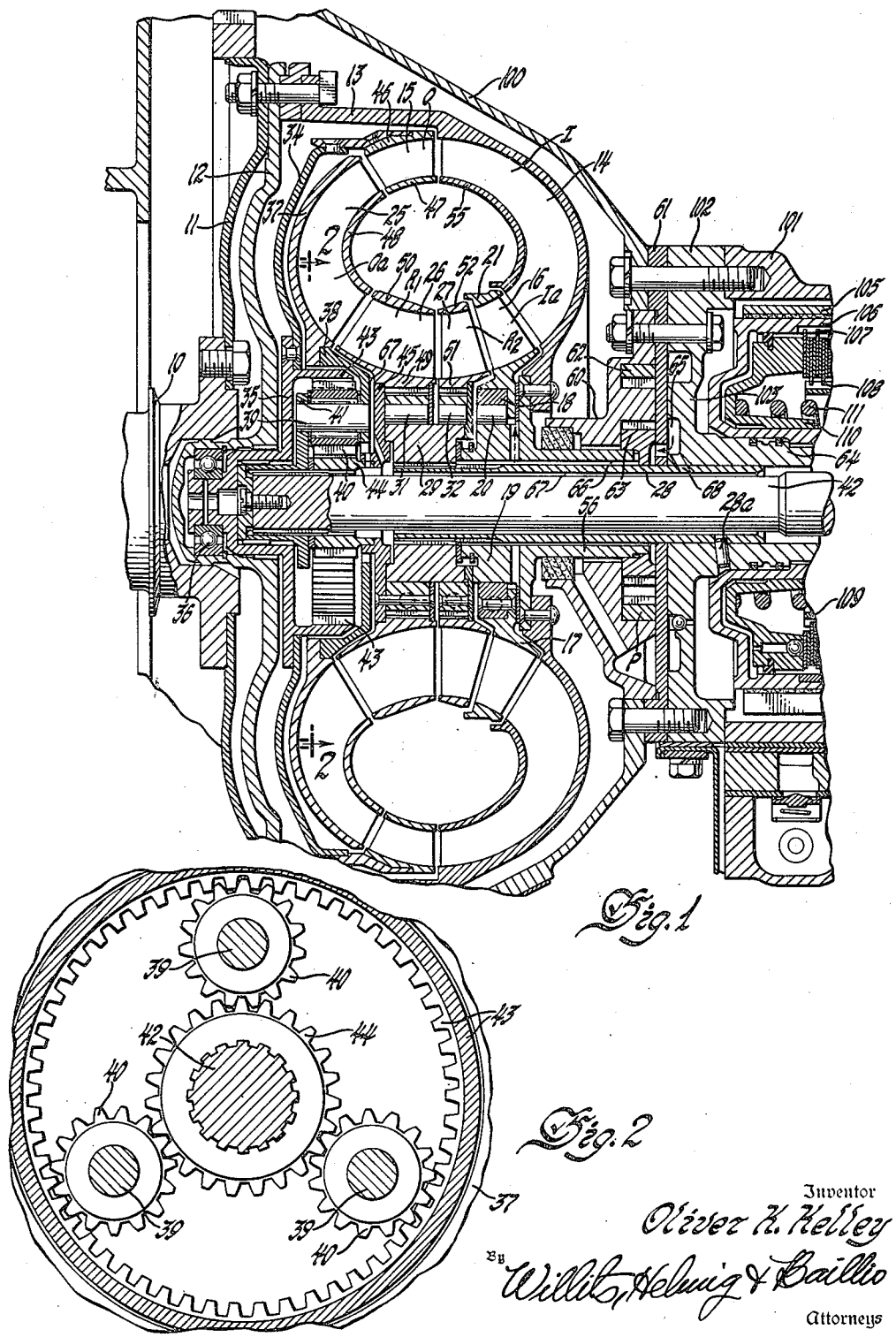
Figure 1 is a cross section elevation of a torque transmitting structure constructed in accordance with the principles of this invention.
Figure 2 is a section of the gear reduction unit for one of the converter output members taken along the line 2—2 of Figure 1.

Referring to the figures, and particularly to Figure 1, the vehicle engine (not shown) is located at the left and drives a drive shaft 10 which acts as the power input shaft for the torque converter. The torque converter is arranged to drive an output shaft through a pair of output members in the manner hereafter described. The forward portion of the assembly is contained within a housing 100 and the rear portion within a housing 101, the converter compartment section being denoted by reference numeral 100.

The engine crankshaft 10 is provided with a flange bolted to a flexplate 11 which, in turn, is bolted to a flywheel 12 and to a drum 13 acting as a container for the converter unit. Drum 13 acts as a backing member for the impeller blades 14 of a primary impeller designated generally as I. Rotation of blades 14 imparts kinetic energy to the working fluid, preferably oil, the blades 14 acting to deliver the working fluid to the blades 15 of a first output turbine or rotor member designated as O. An auxiliary impeller $I_a$, having its blades 16 positioned radially inwardly of the blades 14, has its hub 17 attached to a member 18, which, together with a hub member 19, form a race adapted to receive a plurality of one-way locking elements 20. Blades 16 are supported by means of hub 17 and a core section 21.

The one-way clutch 18—19—20 is provided with cam slots of well-known construction arranged such that the auxiliary impeller $I_a$ may rotate forwardly under influence of the circulating working fluid to over-run the primary impeller I, but may never rotate more slowly than the primary impeller. The hub 19 forms a common base for hub 17 and for drum 13 and is riveted or otherwise secured to drum 13 to be driven thereby. Thus, if the rotational speed of impeller $I_a$ tends to lag behind that of impeller I, the one-way clutch 18—19—20 will lock up thereby directly connecting the hub 17 to drum 13. One-way locking devices of the type employed herein are fully shown and described in my copending application entitled Multiple Stage Torque Converter Drive, Serial No. 790,950, filed December 11, 1947, now abandoned.

A second output turbine member designated generally as $O_a$ is positioned with its blades 25 disposed radially inwardly from blades 15 of output turbine O and adapted to receive fluid from turbine O. The working space of the converter is completed by a pair of reaction rotors $R_1$ and $R_2$ bladed at 26 and 27, the first of which receives working fluid from turbine $O_a$ and delivers it to reaction member $R_2$ and the latter of which delivers the fluid to the auxiliary impeller $I_a$.

The first output turbine O is mounted on a drum 34 fastened to a hub 35 supported for rotation in a bearing 36. The blades 15 are supported by a core section 47 and a shell 46, the shell 46 being carried by drum 34. The second output turbine $O_a$ is supported on a drum 37 secured to a hub 38, the latter hub being fastened to a plurality of radially spaced planet gear carrier pins 39. Each carrier pin 39 rotatably supports a planet gear 40 for rotation about the pin (see Figure 2). While three planet gears are illustrated in Figure 2, it will readily be understood that two or more such planet gears may be utilized. A planet carrier 41 (see Figure 1) in which pins 39 are supported, is splined to an output shaft 42. Hub 35 supports an annulus or ring gear 43 adapted to mesh with planet gears 40, while a sun gear 44, also meshing with planet gears 40, is carried by and supported upon a hub member 45 secured to a blade supporting hub 49 of the first reaction member $R_1$. The planet carrier 41 thus constitutes a power output element directly connected to turbine $O_a$ by means of planet pins 39, and indirectly and differentially connected to turbine O through annulus gear 43 and planet gears 40.

Blades 25 of output turbine $O_a$ are supported by means of drum 37 and core-section 48. Blades 26 of reaction member $R_1$ are supported by means of hub 49 and core-section 50. Blades 27 of reaction member R₂ are supported by means of a hub 51 and core-section 52. A hub 29, common to both reaction members R₁ and R₂ is splined to a non-rotating sleeve 28, and forms a common element of a pair of one-way brakes for preventing backward rotation of the reaction members under the influence of circulating working fluid. One-way locking members 31 are positioned between hubs 29 and 49 to prevent reverse rotation of reaction member R₁, while one-way locking elements 32 are positioned between hub 29 and hub 51 to prevent reverse rotation of reaction member R₂. These one-way brakes are positioned to permit forward rotation of reaction members under the influence of circulating working fluid and may be constructed in accordance with the teachings of my co-pending application heretofore identified. The various hubs and core sections form a chamber through which the working fluid is caused to circulate. Blades 14 of the primary impeller are supported upon drum 13 and core section 55.

A pump P is supported by the radial portion 103 of a web 102 against which is fitted a pump body 60 and a plate 61 properly formed to accommodate a ring gear 62 and the driving pump gear 63 fixed to an axial extension 56 of the hub 19. Hub 19 is formed with an outwardly protruding radial extension riveted or otherwise secured to drum 13. The ported web 102 is formed with an axially extending sleeve 64 extending around a portion of shaft 42. Sleeve 28 is held against rotation by means of a suitable pin 28a fixing the sleeve 64 to the sleeve 28.

The dashed arrow leading from space 65 of the pump end plate 102 indicates the oil flow from pump P to the converter working space. Oil flows through passage 66 between sleeve 28 and extension 56, then radially outward and enters the working space between blades 14 and 16. Here the oil is acted upon by the impellers and is accelerated into the circulating flow through the working chambers. A portion of the oil body escapes at the outward radial parting zone between blades 14 and 15 to flow into the chamber enclosed by flywheel 12, drum 13 and drum 34. Another portion passes through the parting zone between blades 15 and 25 to the chamber between drum 34 and the back of rotor shell 37.

Oil is extracted from the working space through the parting zone between blades 25 and 26, passing through passage 67 which extends radially and then axially between sleeve 28 and shaft 42 to passage 68 leading to the pump.

The shaft 42 may constitute the drive shaft for power output, or may be utilized as an input shaft for further gear reduction means such as, for example, a planetary transmission. A step ratio planetary transmission which may be used in conjunction with the torque converter comprising the present invention is fully described in my aforementioned co-pending application for Letters Patent, Serial Number 790,950, filed December 11, 1947, now abandoned. Such transmissions commonly include fluid pressure actuated servo members for applying the bands and clutches to select the particular gear ratio within the planetary transmission. In the illustration shown, a band 105 extends around a drum 106 and may be applied by means of a fluid pressure actuated piston (not shown) to stop rotation of drum 106 for gear reduction within the unit. A plurality of clutch plates 107 carried by drum 106 are adapted to engage clutch plates 108 carried by a clutch drum 109 when fluid pressure is admitted to servo piston 110 to obtain direct drive through the planetary unit. Spring 111 acts to release the clutch plates when fluid pressure is released from piston 110. The band and clutch apply servo pistons are alternately applied through suitable valving for controlling the fluid pressure to the servo pistons.

In operation, with the vehicle being accelerated from a standing position, output shaft 42 is first prevented from rotation by the vehicle load applied to the shaft. With the vehicle engine idling, impeller I is unable to impart sufficient velocity to the working fluid to cause rotation of the turbine members. Upon increase in engine speed, impeller member I circulates the working fluid at increased speed through turbine members O and Oₐ and through reaction members R₁ and R₂ causing the reaction members to tend to be rotated reversely of the turbine members. One-way brakes 29—31—49 and 29—32—51 thereupon lock up to prevent reverse rotation of the reaction members. Sun gear 44 thereupon becomes a fixed member in mesh with planet gears 40.

Upon further increase in the circulating velocity of the working fluid through the torque converter, the fluid impinging upon the blades of the turbine member O provides sufficient force to cause annulus gear 43 to rotate, thereby imparting drive through the planet gears to the planet carrier and thence to the output shaft. Under this condition of operation, maximum torque multiplication occurs and the transmission is in its "low" speed range. Blades 15 are sharply curved so that circulating working fluid under high velocity will cause turbine O to initially overrun both impeller I and turbine Oₐ.

As the speed of rotation of the output shaft increases under influence of drive imparted thereto from turbine O, turbine member Oₐ, connected to the output shaft through the carrier, increases its rotational speed until such time as the drive occurs through turbine member Oₐ, at which time the drive is directly from the second turbine through the carrier to the output shaft without gear reduction and the converter is in is "direct" or "high" range of operation. Upon further increase in speed of rotation of output turbines O and Oₐ, one-way brake 29—31—49 permits forward rotation of reaction member R₁ and, upon still further increase in speed of rotation of the output turbine Oₐ, reaction member R₂ is caused to rotate forwardly. As the speed of rotation of turbine Oₐ increases, the angle at which the circulating working fluid strikes the blades of the reaction members changes so that the working fluid is caused to strike the rear surfaces of the blades of the reaction elements rather than the front surfaces thereof as is the case when the velocity of the working fluid is relatively high. With the reaction members and impeller member Iₐ rotating freely under influence of the circulating fluid body, the reaction members and auxiliary impeller are able to present the rear surfaces of the vanes carried thereby to the circulating fluid body so that the re-direction of the fluid which otherwise occurs as it passes over the front surfaces of the vanes is minimized. In this manner friction losses and excess heating of the fluid body under "high" range of operation are minimized.

As is apparent, the torque converter consists of six bladed elements arranged with the primary impeller positioned in the outflow zone of the working fluid, two output rotors positioned in the inflow zone, two reaction rotors positioned in the inner radial zone to bridge the inflow and outflow zones, and an auxiliary impeller positioned to direct circulating working fluid from the second reaction rotor to the primary impeller.

The bladed elements are so positioned in the circulating working fluid path and the blades of the elements are so shaped as to permit over-running of certain of the elements with respect to others as the torque multiplication within the converter decreases. Under high torque and high toroidal flow velocity of the working fluid, as occurs during the acceleration of a vehicle from a standing start, the auxiliary impeller may respond to the velocity effect of the working fluid and over-run the primary impeller. The two reaction rotors, under this condition of operation, are restrained from reverse rotation with respect to the turbine members by the one-way brakes associated with the reaction rotors. The sun gear is therefore held stationary by the first reaction rotor, and drive to the output shaft first occurs through the first turbine O, positioned the farthest radially outwardly from the reaction members. Turbine O initially over-runs turbine $O_a$, driving the output shaft through the planetary gear reduction unit.

Due to the initial high velocity of the circulating working fluid, impeller $I_a$ initially over-runs impeller I. As the vehicle accelerates and torque multiplication decreases, the toroidal flow velocity of the working fluid decreases, and the speed of rotation of the auxiliary impeller becomes the same as that of the primary impeller, the two impellers then becoming locked by the one-way clutch 18—19—20 so that the auxiliary impeller is driven by the primary impeller. Continued reduction of torque multiplication and toroidal flow velocity, upon further increase in vehicle velocity, results in a gradual, smooth transfer of drive to the output shaft from turbine O to turbine $O_a$. As the vehicle accelerates, the turbine $O_a$ increases its speed of rotation to transfer the drive from the planetary gear reduction unit to direct drive through the connection between turbine $O_a$ to the planet carrier. The velocity of the circulating fluid gradually decreases as the vehicle accelerates until the fluid strikes the back of the reaction element blades rather than the front surface thereof, whereupon the reaction elements are caused to rotate forwardly in the direction of rotation of the turbine elements. When reaction member $R_1$ rotates freely, no torque can be transmitted through the annulus and planetary gear because of the rotation of the sun gear, and all torque is transmitted to the carrier from turbine $O_a$. It will readily be understood that the torque transfer from the first to the second impeller occurs very gradually and smoothly, depends upon the speed of rotation of sun gear 44, and occurs without any interruption of torque transfer. That is, there is overlap of torque transfer between the two turbines so that turbine $O_a$ gradually assumes the function of transferring torque, while the amount of torque transferred by turbine O decreases in accordance with the increase of speed of rotation of sun gear 44.

The drive arrangement provides for inherent automatic shift from a "low" range to a "high" range as the drive is transferred from initial gear reduction to final direct drive through turbine $O_a$. Due to the initial gear reduction arrangement, the torque converter provides for more rapid vehicle acceleration, reduction of internal slippage in the converter, and greater gas mileage. The transition from low range to high range, as determined by the relative speed of rotation of the plural impeller elements, is accomplished without the use of valves or other control means, and without any lapse occurring in the transmission of torque.

Further advantages are typified in the foregoing description and in the appended claims.

I claim:

1. A torque transmitting mechanism including power input and output shafts, a fluid turbo mechanism having an impeller driven by said input shaft, a plurality of independently rotatable turbine members and a reaction member, a planet carrier connected to said output shaft, planet gears supported upon said carrier, a sun gear meshing with said planet gears, an annulus gear meshing with said planet gears, brake means for preventing reverse rotation of said sun gear with respect to rotation of said annulus gear, means directly connecting said annulus gear to one of said turbine members for driving said output shaft through said planetary gearing and carrier, and means directly connecting said carrier to another of said turbine members for driving said output shaft through said carrier.

2. A torque transmitting mechanism including power input and output shafts, a fluid turbo mechanism having an impeller driven by said input shaft, a plurality of turbine members and a reaction member, a planet carrier directly connected to said output shaft, means directly connecting one of said turbine members to said planet carrier for directly driving said output shaft through said carrier, a gear train connecting another of said turbine members to said planet carrier, and means connecting one element of said gear train to said reaction member for preventing rotation of said element in a direction opposite to the direction of rotation of said turbine members.

3. A torque transmitting mechanism including power input and output shafts, a fluid turbo mechanism having an impeller driven by said input shaft and a plurality of turbine members, a planet carrier connected to said output shaft, planet gears supported upon said carrier, a sun gear meshing with said planet gears, an annulus gear driven by one of said turbine members meshing with said planet gears for driving said output shaft through said planetary gearing and carrier, a direct drive connection between said carrier and another of said turbine members for directly driving said output shaft through said carrier, and restraining means preventing reverse rotation of said sun gear with respect to rotation of said annulus gear.

4. A torque transmitting mechanism including power input and output shafts, a fluid turbo mechanism including an impeller, a pair of turbine members and a pair of reaction members, means connecting said impeller to said power input shaft, a planet carrier, means connecting said carrier to said output shaft, a plurality of planet gears supported upon said carrier, an annulus gear meshing with said planet gears, means connecting said annulus gear to one of said turbine members, means directly connecting said carrier to the other of said turbine members for driving said output shaft through said carrier, a sun gear meshing with said planet gears, means directly connecting said sun gear to one of said reaction members, and one-way brakes for preventing reverse rotation of each of said reaction members with respect to said turbine members.

5. A torque converter including power input and output shafts, fluid turbo mechanism comprising a pair of impellers, a pair of turbine members, and a pair of reaction members; means connecting one of said impellers to said power input shaft, a one-way clutch connecting the other of said impellers to said first-mentioned impeller for driving the same in response to rotation of said first-mentioned impeller and for permitting over-running of said second-mentioned impeller with respect to said first-mentioned impeller, a planet carrier connected to said power output shaft, a plurality of planet gears supported upon said carrier, an annulus gear meshing with said planet gears, a drive connection between said annulus gear and one of said turbine members, a drive connection between said carrier and the other of said turbine members, a sun gear meshing with said planet gears, means connecting said sun gear and one of said reaction members, and a one-way brake associated with each of said reaction members for preventing reverse rotation thereof with respect to said turbine members and for permitting said reaction members to rotate in the direction of rotation of said turbine members.

6. A torque converter comprising a fluid turbo mechanism formed to provide a fluid working space having fluid outflow and inflow zones, a pair of impellers positioned in said fluid outflow zone, a first turbine member bridging said outflow and inflow zones, a second turbine member positioned in said inflow zone, a pair of reaction members bridging said inflow and outflow zones, power input and output shafts, means connecting one of said impellers to said output shaft, one-way clutch means for drivingly connecting the other of said impellers to said first-mentioned impeller and for permitting said second-mentioned impeller to over-run said first-mentioned impeller, a planet carrier connected to said output shaft, a plurality of planet gears supported by said carrier, an annulus gear meshing with said planet gears, means connecting said annulus gear to said first-mentioned turbine member, means connecting said planet carrier to said second-mentioned turbine member, a sun gear meshing with said planet gears, means connecting said sun gear to one of said reaction members, and one-way brake means for preventing reverse rotation of each of said reaction members with respect to said turbine members and for permitting said reaction members to over-run said turbine members under the influence of circulating fluid in said working space.

7. A torque converter including power input and output shafts, an impeller, a pair of turbine members, a reaction member, means connecting said impeller to said power input shaft, one of said turbines being adapted to overrun the other of said turbines, a planet carrier fixed to said output shaft, a plurality of planet gears supported upon said carrier, an annulus gear meshing with said planet gears, means connecting said overrunning turbine to said annulus gear for driving said output shaft through said planet gears and carrier, means directly connecting the other of said turbine members to carrier for driving said output shaft through said carrier, a sun gear meshing with said planet gears, said sun gear being fixed to said reaction member, and a one-way brake for preventing reverse rotation of said reaction member with respect to the turbine members and for permitting said reaction member to rotate in the direction of rotation of said turbine members.

8. A torque converter including power input and output shafts, a pair of turbine members, a reaction member, means connecting said impeller to said power input shaft, one of said turbines being adapted to overrun the other of said turbines, a planet carrier fixed to said output shaft, a plurality of planet gears supported upon said carrier, an annulus gear meshing with said planet gears, means directly connecting said overrunning turbine to said annulus gear for driving said output shaft through said planetary gears and carrier, a carrier web for directly connecting said carrier to the other of said turbines for driving said output shaft through said carrier, said carrier web being shaped to form a chamber positioned directly radially inwardly from said second-mentioned turbine member, said planet gears, carrier and annulus gear being disposed in said chamber, a sun gear disposed within said chamber and meshing with said planet gears, means directly connecting said sun gear to said reaction member, and a one-way brake for preventing reverse rotation of said reaction member with respect to the direction of rotation of said turbine members and for permitting said reaction member to rotate in the direction of rotation of said turbine members.

9. A torque converter including power input and power output shafts, fluid turbo mechanism comprising an impeller, a pair of turbine members, one of said turbine members being arranged to overrun the other of said turbine members, and a pair of reaction members, said impeller being driven by said power input shaft, a planet carrier connected to said power output shaft, a plurality of planet gears supported upon said carrier, an annulus gear meshing with said planet gears, means directly connecting said annulus gear to one of said overrunning turbines for driving said output shaft through said planet gears and carrier, means directly connecting the other of said turbines to said carrier for driving said output shaft through said carrier, a sun gear meshing with said planet gears, means fixedly connecting said sun gear to one of said reaction members, and a one-way brake associated with each of said reaction members for preventing reverse rotation thereof with respect to said turbine members and for permitting independent rotation of said reaction members in the direction of rotation of said turbine members, said one-way brake including a hub on each of said reaction members, a pair of axially aligned locking members associated with said reaction members, respectively, and a common non-rotatable hub associated with each of said locking members.

10. A torque converter including an engine driven impeller, an output shaft, a plurality of turbine members and a reaction member, a planet carrier directly connected to said output shaft, means directly connecting one of said turbine members to said planet carrier for directly driving said output shaft through said carrier, a gear train connecting another of said turbine members to said planet carrier, and means connecting one element of said gear train to said reaction member for preventing reverse rotation of said element with respect to the direction of rotation of said turbine members.

11. A torque transmitting mechanism including power input and output shafts, a fluid turbo mechanism including an impeller, a plurality of turbine members and a reaction member, means connecting said impeller to said input shaft, a planet carrier for driving said output shaft, planet gears supported upon said carrier, a sun gear meshing with said planet gears, an annulus gear driven by one of said turbine members for driving said planet carrier through said planet gears, means directly connecting another of said turbine members to said carrier for driving said output shaft through said carrier, means connecting said sun gear to said reaction member, and restraining means for preventing reverse rotation of said reaction member with respect to said turbine members.

12. A torque converter including an impeller, a power output shaft, a plurality of turbine members, a reaction member, a planet carrier for driving said output shaft, planet gears supported upon said carrier, a sun gear meshing with said planet gears, an annulus gear driven by one of said turbine members for driving said planet carrier through said planet gears, means directly connecting another of said turbine members to said carrier for driving said output shaft through said carrier, means connecting said sun gear to said reaction member, and restraining means for preventing reverse rotation of said reaction member with respect to said turbine members and for permitting said reaction member to rotate in the direction of rotation of said turbine members.

13. A torque transmitting mechanism including an engine driven impeller, output shaft, a pair of turbine members and a pair of reaction members, a planet carrier, means connecting said carrier to said output shaft, a plurality of planet gears supported upon said carrier, an annulus gear meshing with said planet gears, means connecting said annulus gear to one of said turbine members, means directly connecting said carrier to the other of said turbine members for driving said output shaft through said carrier, a sun gear meshing with said planet gears, means directly connecting said sun gear to one of said reaction members, and one-way brakes for preventing reverse rotation of said reaction members with respect to said turbine members.

14. A torque converter comprising an impeller, a first turbine element and a second turbine element and a reaction member, first turbine element being arranged to overrun said second turbine element in initial stages of torque conversion operation, a power output shaft, a planet carrier fixed to said power output shaft, planet gears supported upon said planet carrier, a sun gear in mesh with said planet gears, a ring gear driven by said first turbine member for driving said carrier through said planet gears, means connecting said sun gear to said reaction member, and a one-way brake for preventing reverse rotation of said sun gear with respect to said turbine elements and for permitting forward rotation of said reaction element and sun gear in the direction of rotation of said turbine elements.

15. A power transmission comprising fluid flow cooperative pump, turbine and reactor means, said turbine means including two separate stages, a power input member coupled directly to the pump, a power ouput member coupled directly to the second stage turbine means, means for preventing reverse rotation of the reactor means, a planetary gear system including planet pinion gears mounted for rotation on the output member, a sun gear having meshing engagement with said pinion gears, and a ring gear affixed to the first stage of the turbine means having meshing engagement with said pinion gears, and means for preventing reverse rotation of the sun gear.

16. A power transmission comprising a driving member, a driven member, a toroidal fluid circuit including bladed pump, primary and secondary turbine, and reaction members arranged in cooperative adjacent fluid flow relation, said pump being coupled directly to the driving member and said secondary turbine being coupled directly to the driven member, means for preventing rotation of the reaction member in one direction, a planetary gear train including a ring gear coupled directly to the primary turbine, a sun gear inhibited from rotation in one direction, and planet pinion gears, meshing with the ring and sun gears, supported for rotation on the driven member.

17. A power transmission comprising a power input member, a power output member, a fluid power transmitting device interposed between the input and output members including consecutive adjacent arranged fluid flow cooperative pump, primary and secondary turbine, and reaction member, the pump and secondary turbine being respectively operatively connected to the input and output members, means for preventing the reverse rotation of the reaction member, a planetary gear train including a ring gear, a sun gear and pinion gears, meshing with the ring and sun gears, said ring gear being fixedly secured to the primary turbine, means for preventing reverse rotation of the sun gear and means, having the pinion gears rotatably mounted thereon, operatively connecting the secondary turbine to the output member.

18. A transmission according to claim 17 wherein the reaction member comprises two separate stages.

19. A transmission according to claim 15 wherein the first stage of the turbine is arranged at the position of maximum radius of fluid flow among the pump, turbine and reactor means.

20. A transmission according to claim 15 wherein the first stage turbine means is disposed radially outwardly of the reactor means.

21. A transmission according to claim 20 wherein the second stage turbine means is axially spaced from the pump means by the first stage turbine means and the reactor means.

22. A transmission according to claim 16 wherein the reaction member comprises two separate stages.

23. A transmission according to claim 15 wherein circumferentially spaced shafts connect the second stage turbine means to the output member and wherein the pinion gears are journalled on the circumferentially spaced shafts.

24. A transmission according to claim 18 wherein the stages of the reaction member are prevented from reverse rotation independently of one another.

25. A transmission according to claim 1 wherein the reaction member comprises two separate stages.

26. A transmission according to claim 2 wherein the reaction member comprises two separate stages.

27. A transmission according to claim 1 wherein the reaction member is separated into two stages, each being independently prevented from reverse rotation.

28. A transmission according to claim 2 wherein the reaction member is separated into two stages, each being independently prevented from reverse rotation.

29. A transmission according to claim 1 wherein one of said turbine members is disposed radially outwardly of said reaction member.

30. A transmission according to claim 2 wherein one of said turbine members is disposed radially outwardly of the reaction member.

31. A transmission according to claim 10 wherein one of said turbine members is axially spaced from the impeller by the other turbine member and the reaction member.

32. A transmission according to claim 10 wherein one of said turbine members is disposed radially outwardly from the reaction member.

33. A transmission according to claim 10 wherein circumferentially spaced shafts connect one of the turbine members to the output shaft and wherein the planet gears are journalled on the circumferentially spaced shafts.

References Cited in the file of this patent

UNITED STATES PATENTS

| | | |
|---|---|---|
| 2,203,177 | Patterson | June 4, 1940 |
| 2,298,648 | Russell | Oct. 13, 1942 |
| 2,312,849 | Pollard | Mar. 2, 1943 |
| 2,316,390 | Biermann | Apr. 13, 1943 |
| 2,318,660 | Barrett | May 11, 1943 |
| 2,599,336 | Lemon | June 3, 1952 |
| 2,616,309 | Russell | Nov. 4, 1952 |